Jan. 14, 1964   N. KNAUER   3,117,411
BALANCE WHEEL BEARING MEANS
Filed Sept. 27, 1962   2 Sheets-Sheet 1

3,117,411
BALANCE WHEEL BEARING MEANS

Norbert Knauer, Trossingen, Germany, assignor to Kienzle Uhrenfabriken A.G., Schwenningen am Neckar, Germany, a corporation of Germany
Filed Sept. 27, 1962, Ser. No. 226,651
Claims priority, application Germany Dec. 5, 1961
6 Claims.  (Cl. 58—107)

This invention relates to balance wheel mounting means for use in clock works or in similar devices such as watches wherein a pivot or balance wheel is used.

The features of the invention compared with those of conventional mounting means, provide a more simplified construction to enable better manufacturing and assembly operation as well as increased functional advantages.

The attainment of these features and advantages, especially an assurance of an axial thrust on the balance staff or pivot shaft and the provision for possible adjustment of the distance between bearings for the balance wheel with fewer and more simply produced parts is enabled by the following structural characteristics of the invention.

(1) The small lug for fixing the outer end of the spiral hair spring is mounted on a balance bridge rather than on the work frame so that the oscillatory system can be completely built as a unit and assembled into the works.

(2) A springy part formed from the balance bridge carries the end-stone. Besides insuring a thrust—more particularly an axial thrust—the springiness of this end-stone carrier facilitates assembly with the result that breakage of the balance staff during the adjustment of the distance between balance jewels or bearings is largely eliminated.

(3) Between the bored jewel or journal bearing and the end stone a definite oil space exists which is possible due to the bored jewel being carried in an offset punched, preferably in a circular projection, on the journal bearing carrier. The mantle or peripheral surface of the offset centers the complete balance bridge.

(4) The regulator is guided during turning by the outer peripheral edge surface of the carrier and it is not necessary that the center of this turning be coincident with the balance staff. The regulator is disposed between the works plate or frame and the balance bridge.

(5) A tongue, formed by a cut-out in the work plate, and the work plate proper carry the balance bridge. By means of a light force on the bridge, as produced by an adjusting screw threaded into the work plate, the axial distance between the balance staff bearings can be lessened.

Figure 1:
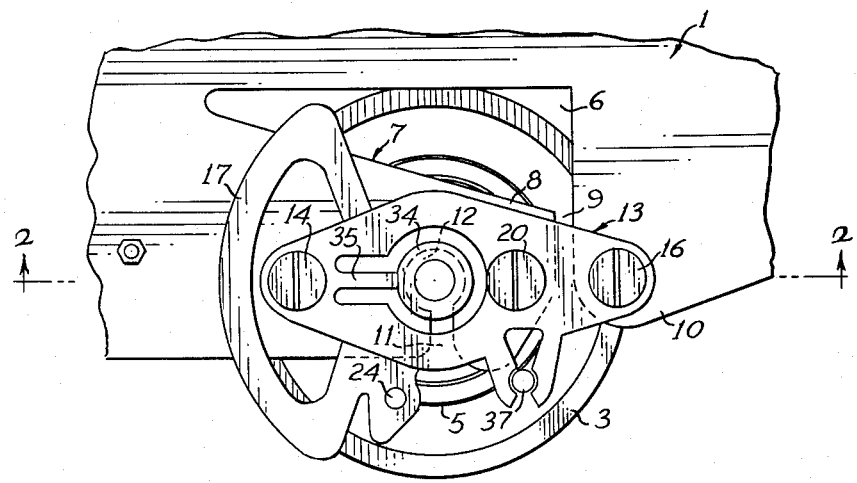
FIG. 1 is a fragmental side view of a portion of a clock work in the zone of the balance.

The balance mechanism of the invention is shown in connection with two metal work frame pieces or plates 1 and 2, say, back and front work plates respectively with a balance wheel 3 on a staff 4 provided with a flat spiral balance spring 5.

The back plate 1 is provided with a large cut-out 6 leaving a bendable and slightly resilient tongue 7 whose end portion 8 is separated from the body of the work plate at a corner part 10 by a gap 9. The tongue end portion 8 is provided with a laterally open slot 11, that is to say, the slot is open at the edge of the work plate 1 as though the cut-out were absent, which slot 11 is in communication with an opening 12 in the end portion 8.

A strip-like metal balance bridge 13 spanning the opening and gap is secured at one end on the tongue near the base thereof, as by a screw 14 threaded into the latter, the bridge being held spaced from the tongue as by a flange 15 on the bridge at the screw to enable a regulator 17 to turn in the space.

The other end of the bridge is attached to the plate corner 10 by an adjusting screw 16 threaded into the corner.

Intermediate the screws 14 and 16 and between the tongue and bridge are the regulator 17 and a carrier 18 for a journal bearing or bored jewel fast on the carrier as shown at 19.

While the bearings in watches are usually termed jewels for journal action and end stones for thrust action, in larger time pieces the material need not be of the nature of precious stones but may be of metal conventionally used for such purposes.

The journal bearing carrier 18 may be an elongated stamping of metal secured to and under the bridge 13 as by a screw 20 at one end, the opposite end portion being provided with a dimple or punched stud 21 to fit into the tongue opening 12 for centering the bearing. The edge 22 of the end of the carrier and about the stud 21 is preferably curved or rounded so that the regulator 17 at its turning portion 23 may be guided around the center of curvature of the edge 22. This center of curvature or the center of turning of the regulator need not be exactly coincident with the center of the journal bearing 19 since it is desirable that the curb pin key as at 24 should preferably move tangentially to a convolution of the balance spring 5 and the convolution is normally spiral shaped and not circular.

The regulator may be turned to adjustment position by known means.

The opposite work plate 2 is provided with a journal bearing 25 for receiving the opposite end of the balance staff 4. An end stone or thrust bearing 26 is mounted on the movable end portion 27 of a leaf spring 28 which is positioned by a punched nipple or stud 29 projecting into a plate hole 30 and by a screw 31 threaded into the plate 2. The spring 28 normally lies substantially flat against the outer face 32 of the plate 2 but can yield against an axial force on the staff which otherwise would endanger damaging the staff.

The opposite end stone 33 associated with bearing 19 is mounted in a carrier 34 within the bridge opening 12 and integral with the bridge through a neck portion 35 narrow enough to be resiliently yieldable against a force great enough to damage the staff.

Different sequences of steps for assembly are possible after the work plate 2 has been provided with its bearings.

Figure 2:
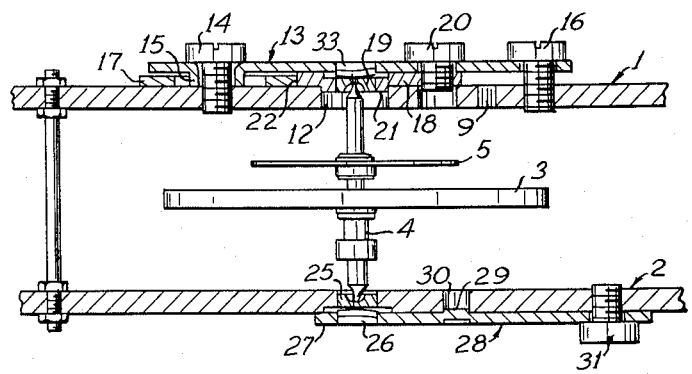
FIG. 2 is a sectional view of the clock work taken substantially along the line 2—2 of FIG. 1 and looking in the direction of the arrows of said line.
Figure 3:
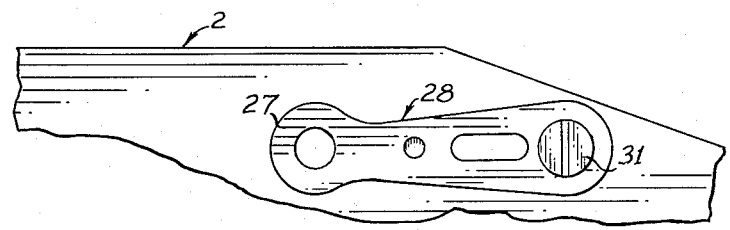
FIG. 3 is a fragmental view of the clock work as seen from the side opposite that of FIG. 1.
Figure 4:
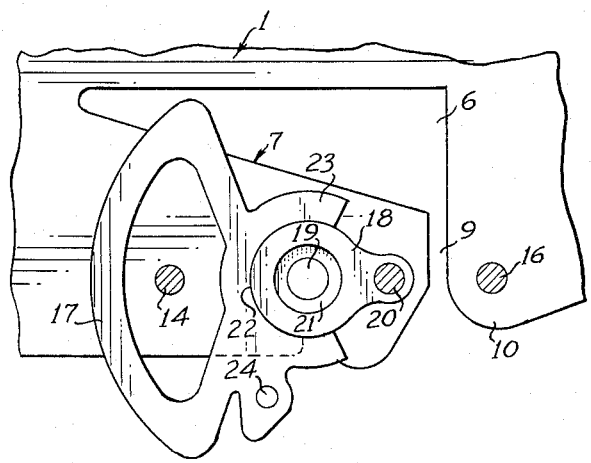
FIG. 4 shows a detail of the invention.

One method of assembly may be to first assemble the complete balance system, including the bridge 13, and move the staff into the slot 11 laterally until the stud 21 is centered with the opening 21 and the staff is alined with the bearing 25, then the whole sub-assembly is allowed to fall in place as in FIG. 2 and screws 14 and 16 are inserted.

The regulator portion 23 embracing the stud 21 may fit around same with sufficient friction to enable the regulator to be retained on the stud during such movement.

There is normally enough resilience or yieldability of the tongue 7 so that tightening of the bridge screw 16 bends the tongue so that the position of bearing 19 can be shifted axially. By adjustment of the screw 16 the end stones 26 and 33 can be positioned with respect to each other to effect a suitable thrust bearing action on the staff 4. The tendency for inward motion of the end stone carriers 28 and 34 is limited by the plate 2 and jewel carrier 18 respectively and the jewels 25 and 19 are so set in their respective carriers that there are oil spaces between the jewels and end stones when the carriers lie in such inner positions.

The outer end of the balance spring 3 is mounted on the bridge 13 by means of a small lug 37.

The invention lends itself to the easy manufacture of component parts such as by ordinary shop tools and more particularly a punch press. Moreover, with normal care, the parts may be assembled and adjusted with a minimum degree of skill.

The invention claimed is:

1. A balance wheel mounting device for a clock work including spaced frame plates, one of said plates having a bendable and slightly resilient tongue, very nearly lying in the plane of such plate, a balance wheel bridge fastened on the tongue and main body of such work plate, a small lug fast on the bridge for mounting the outer end of a balance spring, said bridge having a resilient portion carrying fast an end stone so that the latter may move in the direction of the axis of the balance wheel, the bridge carrying a bored-bearing carrier, said bearing carrier having an inwardly off-set projection, said plate being provided with an aperture to receive said projection and position the bearing carrier with respect to said plate, said bearing carrier being interposed between said resilient portion and the tongue to limit inward movement of said portion to leave an oil space between the bored bearing and the end stone, the bearing carrier having a rounded end edge, and a regulator movable between and guided by the bridge and said plate and further guided by said end edge.

2. A balance wheel mounting device as claimed in claim 1 and a screw passing through one end of the bridge adjacent the end thereof and threaded into the plate to bend the tongue inwardly along the axis of the balance wheel and vary the position of the bored bearing carrier with respect to the plane of said plate.

3. In a clockwork, spaced work plates and a balance wheel and staff between, one of the plates being provided with an internal cut-out near the staff and a marginal slot in the plate to leave a tongue along edge portion of the plate, said tongue in the end portion thereof being provided with an opening and an outwardly open slot in communication with the opening, a strip-like journal bearing carrier having a rounded end portion with the center of curvature in the general zone of the axis of said staff and disposed on the outer face of said tongue and remote from the body of said plate, the carrier having an inwardly off-set projection snugly received in said opening for positioning the carrier on the tongue, a journal bearing fast in the off-set portion and receiving the staff, a bridging strip over the carrier and secured thereto and to the base portion of the tongue and having an end portion crossing said marginal slot and extending over a part of the one plate; and an adjusting screw for varying the planar relationship between the end portion of the tongue and said part of the one plate to adjust the axial position of the journal bearing along the staff.

4. In a clockwork as claimed in claim 3, and end-stones with resilient end-stone carriers mounted with respect to the respective plates to substantially hold the staff in a given axial position during oscillation of the staff.

5. In a clockwork as claimed in claim 4 and means to limit movement of the end-stone carriers toward each other to provide an oil space between the end-stones and journal bearings.

6. In a clockwork as claimed in claim 3, and a regulator between the tongue and bridge and turnable along said rounded end portion.

References Cited in the file of this patent
UNITED STATES PATENTS

| | | |
|---|---|---|
| 1,075,387 | Sokilowski | Oct. 14, 1913 |
| 1,892,514 | Koch | Dec. 27, 1932 |
| 2,242,712 | Sadovsky et al. | May 20, 1941 |